MOLDING COMPOSITIONS HAVING IMPROVED ENVIRONMENTAL STRESS-CRACK RESISTANCE AND LOW-TEMPERATURE IMPACT STRENGTH

Rudolf Glaser, Ludwigshafen, Juergen Schmidtchen, Frankenthal, and Peter Bauer, Luwigshafen, Germany, assignors to Badische Anilin- & Soda-Fabrik Aktiengesellschaft, Ludwigshafen (Rhine), Germany
No Drawing. Original application Oct. 22, 1971, Ser. No. 191,770. Divided and this application Nov. 24, 1972, Ser. No. 308,992
Int. Cl. C08f 37/04
U.S. Cl. 260—897 A        5 Claims

ABSTRACT OF THE DISCLOSURE

Compositions of matter having improved environmental stress-crack resistance and low-temperature impact strength comprising (a) polyethylene, (b) polyisobutylene and (c) N,N'-distearoylethylenediamine. The compositions are used for electrical insulating purposes and the production of moldings.

RELATED APPLICATION

This application is a division of our copending application Ser. No. 191,770, filed Oct. 22, 1971.

The present invention relates to molding compositions comprising polyethylene, polyisobutylene and N,N'-distearoylethylenediamine.

Mixtures of polyethylene and a copolymer of ethylene and vinyl acetate are described in U.K. Pat. 1,058,670. These mixtures may contain fillers, oxidation inhibitors, coloring agents and the like. The resistance of these mixtures of environmental stress cracking is appreciably better than that of polyethylene. Moldings made from these molding compositions have however a lower low-temperature impact strength and yield point than moldings made from polyethylene.

It is an object of the present invention to provide molding compositions which have better low-temperature toughness than prior art molding compositions and whose environmental stress-crack resistance is not decreased.

This object is achieved with a molding composition comprising per 100 parts by weight (A) from 85 to 98.4 parts by weight of polyethylene having a density of 0.915 to 0.965 g./cm.$^3$ and a melt index according to ASTM D–1238–65T of from 0.005 to 20 g./10 minutes;
(B) from 1.5 to 10 parts by weight of polyisobutylene having a molecular weight of from 300,000 to 5,000,000; and
(C) from 0.1 to 5 parts by weight of N,N'-distearoylethylenediamine.

Low or high density polyethylene may be used for the production of the molding compositions. Low density polyethylene having a density of from 0.915 to 0.935 g./cm.$^3$ is particularly suitable. The melt index of the polyethylene (measured according to ASTM D–1238–65T) should be from 0.005 to 20, preferably from 0.05 to 1, g./10 minutes.

The second component of the molding composition according to the invention may be polyisobutylene which has a molecular weight of from 300,000 to 5,000,000. One hundred parts of the molding composition according to the invention contains from 1.5 to 10, preferably from 2.0 to 5.0, parts by weight of polyisobutylene.

The third component of the molding composition according to the invention is N,N'-distearoylethylenediamine:

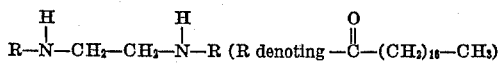

One hundred parts by weight of the molding composition contains 0.1 to 5 parts by weight, preferably 0.5 to 2.8 parts by weight, of N,N'-distearoylethylenediamine.

The molding compositions according to the invention are prepared by conventional methods, for example by mixing the said three components at temperatures of from 100° to 300° C., preferably from 150° to 200° C., in kneaders, on rollers or in twin-screw or single-screw extruders. It is often advantageous to first of all prepare a mixture of polyisobutylene and N,N'-distearoylethylenediamine and then to homogenize this mixture with the polyethylene. Batch production is carried out at temperatures of from 80° to 200° C. and the incorporation of the batch into the polyethylene at temperatures of from 120° to 250° C.

The molding compositions in accordance with the invention may contain conventional additives such as coloring agents, polyolefin stabilizers and/or fillers, for example chalk or carbon black.

The molding compositions according to the invention are suitable for the production of moldings, for example tubes, cable sheaths, profiles, hollow articles and injection moldings. The molding compositions may be processed on conventional molding equipment.

The invention is further illustrated by the following Examples and Comparative Examples. The molecular weight of the polyisobutylene is the viscosity-average molecular weight. In all cases 4,4'-thiobis-(3-methyl-6-tertiary-butyl-1-phenol) is used as the heat stabilizer for the polyolefin.

EXAMPLE 1

Specimens are prepared by homogenizing in a roller kneader (Type: Plastograph, manufactured by Brabender OHG, Duisburg, Germany) running at a speed of 125 r.p.m. at a temperature of 154° C. from 95.4 parts of polyethylene having a density of 0.918 g./cm.$^3$ and a melt index of 0.18 (190° C./2.16 kg.), 0.1 part of a polyolefin heat stabilizer, 3.5 parts of polyisobutylene having a molecular weight of 1,000,000 and 1 part of N,N'-distearoylethylenediamine. The homogeneous mixture is then kneaded for one hour under the said conditions. Sheets having a thickness of 3 mm. are compression molded which are then quench cooled and conditioned at 70° C. for eighteen hours. Specimens are prepared from the compression molded sheets according to ASTM D–1693–65T and tested. In modification of the ASTM test procedure, the concentration of the wetting agent is 10%. No failures can be detected even after one thousand hours in the stress-crack resistance test according to ASTM D–1693–65T.

COMPARATIVE EXAMPLE 1

Specimens are prepared as described in Example 1 from 92.9 parts of polyethylene having a density of 0.918 g./cm.$^3$ and a melt index of 0.18 (190° C./2.16 kg.), 0.1 part of a polyolefin heat stabilizer and 7 parts of polyisobutylene having a molecular weight of 1,000,000 and tested for stress-crack resistance. 50% of the specimens fail after one hour.

COMPARATIVE EXAMPLE 2

Specimens are prepared as described in Example 1 from 95.5 parts of polyethylene having a density of 0.918 g./cm.$^3$ and a melt index of 0.18 (190° C./2.16 kg.), 0.1 part of a polyolefin heat stabilizer, 3.5 parts of polyisobutylene having a molecular weight of 1,000,000 and 1 part of stearyl ethylamide and tested for stress-crack resistance. 50% of the specimens fail after thirty minutes.

COMPARATIVE EXAMPLE 3

Specimens are prepared as described in Example 1 from 95.4 parts of polyethylene having a density of 0.918 g./cm.³ and a melt index of 0.18 (190° C./2.16 kg.), 0.1 part of a polyolefin heat stabilizer, 3.5 parts of polyisobutylene having a molecular weight of 1,000,000 and 1 part of N,N'-dipalmitoylethylenediamine and tested for stress-crack resistance. 50% of the specimens fail after three hours.

COMPARATIVE EXAMPLE 4

Specimens are prepared as described in Example 1 from 95.4 parts of polyethylene having a density of 0.918 g./cm.³ and a melt index of 0.18 (190° C./2.16 kg.), 0.1 part of a polyolefin heat stabilizer, 3.5 parts of polyisobutylene having a molecular weight of 1,000,000 and 1 part of stearamide and tested for stress-crack resistance. 50% of the specimens fail after one hour.

COMPARATIVE EXAMPLE 5

Specimens are prepared as described in Example 1 from 81.9 parts of polyethylene having a density of 0.918 g./cm.³ and a melt index of 0.18 (190° C./2.16 kg.), 0.1 part of a polyolefin heat stabilizer and 18 parts of a polyisobutylene having a molecular weight of 1,000,000 and tested for stress-crack resistance. No failures can be detected after one thousand hours. In the test for low-temperature impact strength according to ASTM D–746–65T at −76° C. 40% of the specimens fail. The yield point according to DIN 53,455 is 68 kg./cm.².

COMPARATIVE EXAMPLE 6

Specimens are prepared as described in Example 1 from 99.9 parts of polyethylene having a density of 0.918 g./cm.³ and a melt index of 0.18 (190° C./2.16 kg.) and 0.1 part of a polyolefin heat stabilizer and tested for stress-crack resistance. All of the specimens fail after thirty minutes. None of the specimens fail in the test for low-temperature impact strength according to ASTM D–746–65T at −76° C. The yield point according to DIN 53,455 is 96 kg./cm.².

As the Example and Comparative Examples show, it is surprising that by adding N,N'-distearoylethylenediamine to mixtures of polyethylene and polyisobutylene a molding composition is obtained which has a low temperature impact strength comparable with that of pure polyethylene and whose resistance to environmental stress cracking is not lower than that of prior art molding compositions comprising polyethylene and a copolymer of ethylene and vinyl acetate. Molding compositions of polyethylene with polyisobutylene which contain an addition of N,N'-distearoylethylenediamine according to the invention also exhibit only a very slight drop in the yield point. Comparative Examples 2, 3 and 4 show that it is not possible to obtain the surprising effect achieved in accordance with the invention by adding stearyl ethylamide, stearamide or N,N'-dipalmitoylethylenediamine to prior art molding compositions comprising polyethylene and polyisobutylene.

The invention is hereby claimed as follows:

1. A composition of matter having improved environmental stress-crack resistance and low-temperature impact strength comprising per 100 parts by weight
   (A) 85 to 98.4 parts by weight of polyethylene having a density of from 0.915 to 0.965 g./cm.³ and a melt index according to ASTM D–1238–65T of from 0.005 to 20 g./10 minutes;
   (B) 1.5 to 10 parts by weight of polyisobutylene having a molecular weight of from 300,000 to 5,000,000; and
   (C) 0.1 to 5 parts by weight of N,N'-distearoylethylenediamine.

2. A composition as claimed in claim 1, said polyethylene having a melt index according to ASTM D–1238–65T of 0.05 to 1 g./10 minutes.

3. A composition as claimed in claim 1, the amount of polyisobutylene being 2.0 to 5.0 parts by weight.

4. A composition as claimed in claim 3, the amount of said N,N'-distearoylethylenediamine being 0.5 to 2.8 parts by weight.

5. A composition as claimed in claim 1, the amount of said N,N'-distearoylethylenediamine being 0.5 to 2.8 parts by weight.

References Cited

UNITED STATES PATENTS

| | | | |
|---|---|---|---|
| 3,230,190 | 1/1966 | Nowton et al. | 260—23 H |
| 3,299,181 | 1/1967 | Coover, Jr. et al. | 260—897 B |

MURRAY TILLMAN, Primary Examiner

J. ZIEGLER, Assistant Examiner

U.S. Cl. X.R.

161—216; 260—45.9 R